US009838316B2

(12) United States Patent
Hegde et al.

(10) Patent No.: US 9,838,316 B2
(45) Date of Patent: Dec. 5, 2017

(54) OVERLOAD FUNCTIONALITY IN OVERLAY NETWORKS

(71) Applicant: Juniper Networks, Inc., Sunnyvale, CA (US)

(72) Inventors: Shraddha Hegde, Bangalore (IN); Pushpasis Sarkar, Bangalore (IN); Hannes Gredler, Pillberg (AT)

(73) Assignee: Juniper Networks, Inc., Sunnyvale, CA (US)

( * ) Notice: Subject to any disclaimer, the term of this patent is extended or adjusted under 35 U.S.C. 154(b) by 232 days.

(21) Appl. No.: 14/666,151

(22) Filed: Mar. 23, 2015

(65) Prior Publication Data

US 2016/0261501 A1 Sep. 8, 2016

Related U.S. Application Data

(60) Provisional application No. 62/128,880, filed on Mar. 5, 2015.

(51) Int. Cl.
*H04L 12/701* (2013.01)
*H04L 12/801* (2013.01)
*H04L 12/707* (2013.01)
*H04L 12/715* (2013.01)
*H04L 12/721* (2013.01)

(52) U.S. Cl.
CPC .............. *H04L 47/12* (2013.01); *H04L 45/22* (2013.01); *H04L 45/64* (2013.01); *H04L 45/68* (2013.01); *H04L 47/115* (2013.01)

(58) Field of Classification Search
CPC ......... H04L 45/22; H04L 45/64; H04L 45/68; H04L 47/12; H04L 47/122
See application file for complete search history.

(56) References Cited

U.S. PATENT DOCUMENTS

| 5,485,453 A | 1/1996 | Wahlman et al. |
| 6,928,603 B1 | 8/2005 | Castagna et al. |
| 7,602,702 B1 | 10/2009 | Aggarwal |
| 7,876,694 B2 | 1/2011 | Menon et al. |
| 8,125,926 B1 | 2/2012 | Kompella |

(Continued)

OTHER PUBLICATIONS

Roy, ISIS training and Junos configuration, Jan. 11, 2014, iNETZERO, 35 pages.*

(Continued)

*Primary Examiner* — Hoon J Chung
(74) *Attorney, Agent, or Firm* — Shumaker & Sieffert, P.A.

(57) ABSTRACT

In general, techniques are generally described for reducing or preventing transient black-holing of network traffic in an overlay network. A method includes executing, by a network device included in a link state domain, an Interior Gateway Protocol (IGP) to exchange link-state messages with at least one remote network device in the link-state domain; generating, by the network device, an IGP link-state message that includes link overload information to overload a link in the link-state domain that couples the network device to the remote network device; and sending, by the network device and to the at least one other network device, the IGP link-state message that includes the link overload information to direct the remote network device to stop sending network traffic to the network device using the overloaded link.

15 Claims, 6 Drawing Sheets

(56) References Cited

U.S. PATENT DOCUMENTS

| | | | |
|---|---|---|---|
| 8,837,479 | B1 | 9/2014 | Kumar et al. |
| 2007/0115962 | A1 | 5/2007 | Mammoliti et al. |
| 2007/0189193 | A1* | 8/2007 | Previdi ............... H04L 12/1868 370/256 |
| 2007/0260746 | A1* | 11/2007 | Mirtorabi ................ H04L 12/66 709/238 |
| 2008/0186844 | A1 | 8/2008 | He et al. |
| 2008/0285466 | A1 | 11/2008 | Salam et al. |
| 2014/0022886 | A1 | 1/2014 | Sinha |
| 2014/0029447 | A1 | 1/2014 | Schrum, Jr. et al. |
| 2015/0372901 | A1* | 12/2015 | Pacella ................... H04L 45/28 370/225 |

OTHER PUBLICATIONS

Office Action from U.S. Appl. No. 14/755,705, dated Nov. 9, 2016, 10 pp.

Kompella, et al., "Virtual Private LAN Service (VPLS) Using BGP for Auto-Discovery and Signaling," Network Working Group, RFC 4761, Jan. 2007, 20 pp.

Kompella, et al., "Multi-homing in BGP-based Virtual Private LAN Service," draft-kompella-l2vpn-vpls-multihoming-02.txt, Network Working Group, Internet-Draft, Nov. 3, 2008, 19 pp.

ISO/IEC 10589, International Standard, "Information technology—Telecommunications and information exchange between systems—Intermediate System to Intermediate System intra-domain routeing information exchange protocol for use in conjunction with the protocol for providing the connectionless-mode network service (ISO 8473)," Second Edition Nov. 15, 2002, 210 pp.

Moy, "OSPF Version 2," Network Working Group, Request for Comments: 2328, Apr. 1998, 194 pp.

Katz, et al., "Bidirectional Forwarding Detection (BFD)," Internet Engineering Task Force (IETF), RFC 5880, Jun. 2010, 34 pp.

Psenak, et al., "OSPFv2 Prefix/Link Attribute Advertisement," draft-ietf-ospf-prefix-link-attr-00.txt, Network Working Group, Internet Draft, Aug. 12, 2014, 10 pp.

Lindem, et al., "OSPFv3 LSA Extendibility," draft-ietf-ospfv3-lsa-extend-06.txt, Network Working Group, Internet-Draft, Feb. 16, 2015, 23 pp.

Vasseur, et al., "Definition of an IS-IS Link Attribute Sub-TLV," Network Working Group, RFC 5029, Sep. 2007, 5 pp.

Extended Search Report from counterpart European Application No. 16158747.2, dated Jul. 14, 2016, 8 pp.

Office Action from U.S. Appl. No. 14/675,303, dated Nov. 3, 2016, 18 pp.

Amendment in Response to Office Action dated Nov. 9, 2016 from U.S. Appl. No. 14/755,705, filed Feb. 8, 2017, 10 pp.

Notice of Allowance from U.S. Appl. No. 14/755,705, dated Feb. 23, 2017, 9 pp.

Response to Extended European Search Report dated Jul. 14, 2016, and Communication dated Aug. 10, 2016, from counterpart European Application No. 16158747.2, filed on Mar. 3, 2017, 3 pp.

Li et al., "IS-IS Extensions for Traffic Engineering," Network Working Group, RFC 5305, The IETF Trust, Oct. 2008, 17 pp.

Parker, "Recommendations for Interoperable IP Networks using Intermediate System to Intermediate System (IS-IS)," Network Working Group, RFC 3787, The Internet Society, May 2004, 11 pp.

Retana et al, "OSPF Stub Router Advertisement," Network Working Group, RFC 3137, The Internet Society, Jun. 2001, 5 pp.

Examination Report from counterpart European Application No. 16158747.2, dated Jul. 4, 2017, 7 pp.

* cited by examiner

OVERLOAD FUNCTIONALITY IN OVERLAY NETWORKS

This application claims the benefit of U.S. Provisional Application No. 62/128,880, filed Mar. 5, 2015, the entire contents of which is incorporated herein by reference.

TECHNICAL FIELD

This disclosure relates to computer networks and, more particularly, to virtual private local area networks.

BACKGROUND

Networks that primarily utilize data link layer devices are often referred to as layer two (L2) networks. A data link layer device is a device that operates within the second layer of the Open Systems Interconnection (OSI) reference model, i.e., the data link layer. One example of a common L2 network is an Ethernet network in which end point devices (e.g., servers, printers, computers, and the like) are connected by one or more Ethernet switches. The Ethernet switches forward Ethernet frames, also referred to as L2 communications or L2 packets to devices within the network. As the Ethernet switches forward the Ethernet frames, the Ethernet switches learn L2 state information for the L2 network, including media access control (MAC) addressing information for the devices within the network and the physical ports through which the devices are reachable. The Ethernet switches typically store the MAC addressing information in MAC tables. When forwarding an individual Ethernet frame, an ingress port of an Ethernet switch typically broadcasts the Ethernet frame to all of the other physical ports of the switch unless the Ethernet switch has learned the specific physical port through which the destination MAC address devices is reachable. In this case, the Ethernet switch forwards a single copy of the Ethernet frame out the associated physical port.

A virtual private local area network service (VPLS) is one example of an L2 virtual private network (VPN) service that may be used to extend two or more remote customer networks, i.e., VPLS sites, through a layer three (L3) intermediate network (usually referred to as the VPLS core) in a transparent manner, i.e., as if the intermediate network does not exist and the remote customer networks are instead directly connected to one another. In particular, the VPLS transports L2 communications, such as Ethernet packets, between customer networks via the intermediate network. In a typical configuration, provider edge (PE) routers coupled to the customer networks operate as ingress and egress for label switched paths (LSPs) or other tunnels that may be used as pseudowires within the provider network to carry encapsulated L2 communications as if the customer networks were directly attached to the same local area network (LAN). These PE routers may be referred to as "members of the VPLS domain" in that they run a VPLS instance for the VPLS domain and maintain L2 state information for the VPLS service. The PE routers may use either Border Gateway Protocol (BGP) or Label Distribution Protocol (LDP) as the control plane protocol for signaling the VPLS service. While VPLS is an example of a multipoint-to-multipoint service, an L2 virtual circuit or pseudowire is an example of a point-to-point service that may be used to connect two remote customer networks.

In some instances, an Interior Gateway Protocol (IGP) may be run over a pseudowire to provide a seamless private network for the customer. Running an IGP over a pseudowire may establish an overlay network in which two customer networks appear to be connected by a single logical link, where the single logical link is comprised of multiple physical links and PE routers in the service provider network. In some instances, when a PE device is taken offline for maintenance, a service provider may wish to preemptively notify other devices that the PE device is being taken offline to prevent packets from being dropped. However, informing other devices in a network that a PE device is being taken offline may be difficult to achieve in overlay networks.

SUMMARY

The techniques described herein are generally directed to reducing or preventing transient black-holing of network traffic in an overlay network. Techniques of the disclosure may extend IGP link-state messages to include "link-overload information" that instruct other network devices in the same IGP domain to stop sending network traffic on a particular link in the IGP domain. For instance, a PE router that implements a pseudowire between two customer edge routers ("CE routers") may not be included the IGP domain that includes the CE routers. Because the PE router is not visible to the CE routers in the IGP domain, if the PE router is taken offline, the PE router may not be able to notify other CE routers in the IGP domain that are not directed coupled to the PE router.

In accordance with techniques of the disclosure, a CE router that is directly coupled to the PE router may determine that the PE router is being taken offline. The CE router may flood link-state messages that include the link-overload information to other routers in the IGP domain, and further "overload" or otherwise stop using the link between the PE router and CE router to forward network traffic. Sending link-overload information to other CE routers in the IGP domain may prevent transient black-holing of network traffic at the PE router going down for maintenance because other CE routers in the IGP domain may re-route network traffic to bypass the PE router before the PE router is taken offline for maintenance.

In one example, a method includes executing, by a network device included in a link state domain, an Interior Gateway Protocol (IGP) to exchange link-state messages with at least one remote network device in the link-state domain; generating, by the network device, an IGP link-state message that includes link overload information to overload a link in the link-state domain that couples the network device to the remote network device; and sending, by the network device and to the at least one other network device, the IGP link-state message that includes the link overload information to direct the remote network device to stop sending network traffic to the network device using the overloaded link.

In one example, a network device includes at least one processor; at least one module operable by the at least one processor to: execute an Interior Gateway Protocol (IGP) to exchange link-state messages with at least one remote network device included a link-state domain that includes the network device; generate an IGP link-state message that includes link overload information to overload a link that couples the network device to the remote network device in the link-state domain; and send, to the at least one other network device, the IGP link-state message that includes the link overload information to direct the remote network device to stop sending network traffic to the network device using the overloaded link.

In one example, computer-readable medium includes instructions for causing at least one programmable processor of a network device to: execute an Interior Gateway Protocol (IGP) to exchange link-state messages with at least one remote network device included a link-state domain that includes the network device; generate an IGP link-state message that includes link overload information to overload a link that couples the network device to the remote network device in the link-state domain; and send, to the at least one other network device, the IGP link-state message that includes the link overload information to direct the remote network device to stop sending network traffic to the network device using the overloaded link.

The details of one or more embodiments are set forth in the accompanying drawings and the description below. Other features, objects, and advantages will be apparent from the description and drawings, and from the claims.

DETAILED DESCRIPTION

Figure 1:
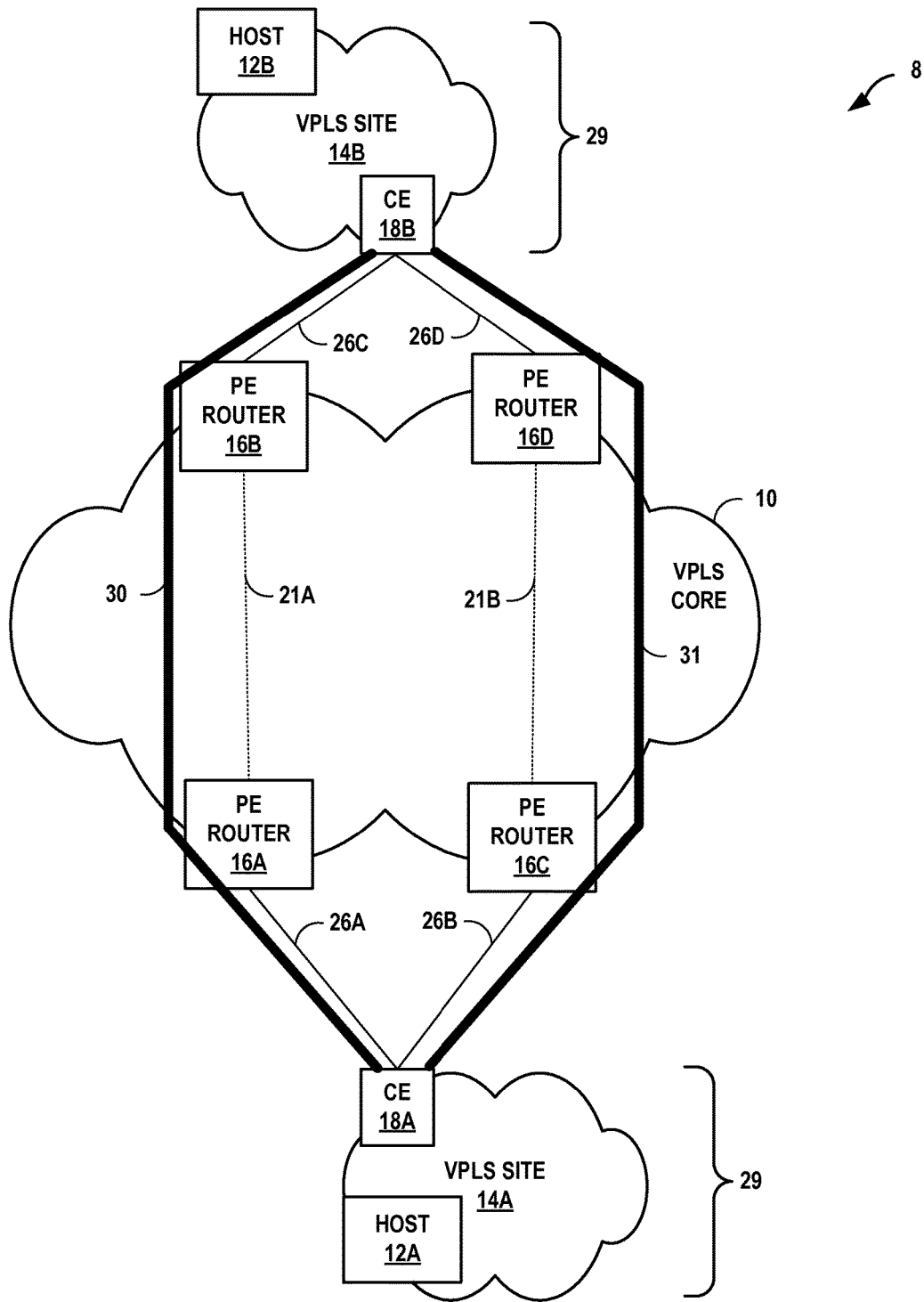
FIG. 1 is a block diagram of an example system that includes one or more network devices configured to prevent transient black-holing of traffic in an overlay network, in accordance with the techniques described herein.

FIG. 1 is a block diagram of an example system that includes one or more network devices configured to prevent transient black-holing of traffic in an overlay network, in accordance with the techniques described herein. FIG. 1 illustrates an example system 8 in which a routed layer three (L3) service provider network 10 is a VPLS core to provide layer two (L2) connectivity between hosts 12A-12B of VPLS sites 14A-14B ("VPLS sites 14"). That is, virtual private local area network service (VPLS) may be used to extend L2 connectivity for two or more remote networks, e.g., VPLS sites 14, through L3 SP network 10 in a transparent manner, as if intermediate SP network 10 does not exist. In particular, the VPLS transports layer two (L2) communications, such as Ethernet packets, between one or more host devices 12A-12B ("host devices 12") within VPLS sites 14 via SP network 10. In a typical configuration, provider edge (PE) routers 16A-16D ("PE routers 16") exchange L2 communications (e.g., Ethernet frames) with customer edge (CE) routers 18A-18C ("CE routers 18"). Although shown for purposes of example as CE routers, PE routers 16 may in some examples be coupled to VPLS sites 14 by other devices, such as network switches.

PE routers 16 are interconnected by a set of label switched paths (LSPs) that may be used as VPLS pseudowires within L3 SP network 10 to carry encapsulated L2 communications as if the customer networks were directly attached to the same local area network (LAN). For instance, a VPLS pseudowire 21A may be configured between PE router 16B and PE router 16A. VPLS pseudowire 21A may be implemented with one or more physical links (and/or other PE routers) that couple PE router 16B and PE router 16A. Using VPLS pseudowire 21A, VPLS sites 14A and 14B may appear to be directly attached to the same local area network (LAN).

In BGP-based VPLS networks, BGP is used as the control plane protocol for signaling the VPLS service, but it should be understood that other appropriate protocols may also be used. PE routers 16 that participate in the BGP-based VPLS signaling and maintain L2 state information for the customer sites may be referred to as "members of the VPLS domain." In the example of FIG. 1A, VPLS pseudowire 21A is established to carry communications between PE router 16A and 16B, and VPLS pseudowire 21B is established to carry communications between PE router 16C and PE router 16D. VPLS pseudowires 21 may be bi-directional pseudowires. Additional details related to VPLS can be found in K. Kompella, "Virtual Private LAN Service (VPLS) Using BGP for Auto-discovery and Signaling," Request for Comments: 4761, The IETF Trust, January 2007, which is hereby incorporated by reference in its entirety.

In the example of FIG. 1A, VPLS site 14A is connected to SP network 10 by a bridged L2 access network that provides redundant physical L2 connectivity to SP network 10 through multiple PE routers 16A, 16C via links 26A and 26B, a technique which is referred to as "multi-homing." Specifically, VPLS site 14A, via CE router 18A, is multi-homed to SP network 10 through PE routers 16A and 16C. Additional details related to multi-homing in BGP-based VPLS can be found in K. Kompella, "Multi-homing in BGP-based Virtual Private LAN Service," draft-kompella-12vpn-vpls-multihoming-02.txt, November 2008, which is hereby incorporated by reference in its entirety.

In some examples, multi-homing PE routers 16A, 16C may be configured to form a multi-chassis link aggregation group (LAG) for physical access links 26A, 26B within a bridged L2 access network that provide L2 connectivity for multi-homed VPLS site 14A. In one example, each of CE router 18A and PE routers 16A, 16C optionally execute the Link Aggregation Control Protocol (LACP) to bundle physical interfaces associated with access links 26A, 26B and treat the bundle as a single logical interface in terms of L2 forwarding. That is, CE router 18A associates links 26A, 26B with a single logical interface for purposes of L2 forwarding to utilize the links in parallel to increase the link speed beyond the limits of any one single cable or port, and to increase the redundancy for higher availability. Moreover, PE routers 16A, 16C may form a LAG as a multi-chassis LAG in that physical links 26A, 26B do not solely interconnect two network devices but instead provide CE 18A with connectivity to different network devices, i.e., PE routers 16A and 16C. CE router 18A, PE router 16B and PE router 16D may be configured with physical links 26C and 26D in a similar manner as described with respect to CE router 18C, PE router 16A and PE router 16C.

In some examples, PE routers 16 and/or CE routers 18 may run an Interior Gateway Protocol (IGP). IGPs use flooding-based distribution mechanisms to announce topology information to routers within the network. These routing protocols typically rely on routing algorithms that require each of the routers to have synchronized routing topology information. Examples of IGPs may include Open Shortest Path First (OSPF) and Intermediate system to intermediate system (IS-IS) routing protocols. OSPF and IS-IS are link state protocols that use link state messages to ensure their routing topology is synchronized with respect to available interfaces, metrics and other variables associated with network links. For example, OSPF utilizes Link State Advertisements (LSAs) as link-state messages, while IS-IS uses Link State protocol data units (LSPs) as link-state messages to exchange information.

A router generating a link state message typically floods the link state message throughout the network such that every other router receives the link state message. In network topologies where routers are connected by point-to-point connections, each router floods link state messages to adjacent routers reachable on each interface to ensure synchronization. In networks using multi-access media, such as an Ethernet network, the routers within the network flood the link state messages to all other routers. In either case, the receiving routers construct and maintain their own network topologies using the link information received via the link state messages. IS-IS is specified in "Intermediate system to Intermediate system routing information exchange protocol for use in conjunction with the Protocol for providing the Connectionless-mode Network Service (ISO 8473)", ISO, ISO/IEC 10589:2002, the entire contents of which is incorporated herein by reference. Further details of OSPF can be found in RFC 2328, Internet Engineering Task Force (IETF), herein incorporated by reference.

Generally, PE routers 16 and CE routers 14 use flooding-based routing protocols to announce topology information to each other and synchronize link-state databases maintained by each of the routers. Link state messages defined by the IGP may include one or more Type, Length, Values (TLVs). A TLV may include one or more fields that each includes respective data, where the data may be processed by a router during a lookup operation. During the lookup operation, the router may perform one or more operations based on the data included in the fields of the TLV.

TLVs may be carried by a variety of different types of link state messages. For example, PE routers 16 and CE routers 14 typically exchange initial link state messages to establish the adjacency relationship. For example, PE routers 16 and CE routers 14 may exchange IS-IS HELLO protocol data units (PDUs) to establish adjacencies with other routers. PE routers 16 and CE routers 14 may include one or more TLVs described herein within such PDUs. Each link state message is may be refreshed periodically on the network and is acknowledged by the receiving routers. For example, PE routers 16 and CE routers 14 may utilize periodic IS-IS link state PDUs for synchronizing their link-state databases and utilize partial sequence number PDUs (PSNPs) and complete sequence number PDUs (CSNPs) to acknowledge receipt of the information. PE routers 16 and CE routers 14 may embed the TLV within the link state PDUs, or within the acknowledgement PDUs.

In the example of FIG. 1, CE routers 18 may run IGPs, such as OSPF or IS-IS, over VPLS pseudowires. Accordingly, in the example of FIG. 1, CE routers 18A and 18B each are each included in the same IGP domain 29. An IGP domain may include an identifiable set of one or more network devices that each executes an IGP and exchanges link-state messages with other network devices in the same identifiable set. By running IGP over VPLS pseudowires implemented by PE routers 16, one or more of CE routers 18 may establish an overlay network in which the IGP is "overlaid" or otherwise running on VPLS pseudowires. In such overlay networks, PE routers 16 and physical links between PE routers 16 that are used to implement VPLS pseudowires 21A and 21B may not be visible to CE routers 18 that are running IGP. However, VPLS pseudowires 21A and 21B may appear as respective links to CE routers 18A and 18B within the IGP domain.

In some examples, an administrator that operates service provider network 10 may perform maintenance on one or more of PE routers 16. To perform maintenance on a PE router, the PE router may be powered down, rebooted, or otherwise taken offline, such that the PE router cannot send and/or receive packets. Accordingly, any packets sent to the PE router, while maintenance is being performed on the PE router, may be dropped, rather than processed and/or forwarded by the PE router. For instance, if PE router 16A is taken offline for maintenance, any packets sent by CE router 18 to PE router 16A or PE router 16B to PE router 16A may be dropped (i.e., transient traffic black-holing).

IGPs, such as OSPF and IS-IS may implement "node-overload" functionality to avoid transient traffic black-holing. For instance, RFC 3137 in OSPF and RFC 3787 in IS-IS, may specify node overload functionality, rather than link-overload functionality as described in this disclosure. Taking RFC 3137 in OSPF as an example, a PE router that is being taken offline for maintenance may announce its router-LSA to its neighboring routers in its IGP domain and indicate that all of the PE router's links are unavailable to send or receive network traffic. However, such techniques only provide for an "overloaded node" (e.g., the entire PE router being taken down for maintenance), rather than allowing the PE router to specify a particular link of the PE router to be overloaded, such that the particular link is made unavailable for sending or receiving network traffic. Moreover, a PE router, using the techniques of RFC 3137 in OSPF and RFC 3787 in IS-IS, must be in the same IGP domain as the neighboring routers or otherwise visible to the neighboring routers in order for the neighboring routers to receive the notifications from the PE router that it is going down for maintenance.

In the case of overlay networks, such as FIG. 1, where CE router 18A and CE router 18B appear to be directly connected when using VPLS pseudowire 21A, PE router 16A and therefore PE router 16B are not visible within the same IGP domain 29 that includes CE router 18B and CE router 18A. Because PE routers 16A and 16B are not visible within IGP domain 29 that includes CE router 18A and CE router 18B, it may not be possible for PE router 16A to use RFC 3137 in OSPF or RFC 3787 in IS-IS to notify CE router 18B when PE router 16A is going down for maintenance. As such, under the RFC 3137 in OSPF and RFC 3787 specifications, PE router 16A may not have a way to notify CE router 18B to stop forwarding network traffic on the logical link 30 defined in the IGP domain between CE routers 18A and 18B that uses VPLS pseudowire 21A. In some examples, a logical link may refer to a link that is not defined or identifiable by its physical structure, by rather by a path between two endpoint (e.g., two network devices), where the path may be implemented by one or more physical links and/or network devices.

Although PE router 16A may be able to notify CE router 18A that PE router 16A is going offline for maintenance using a protocol such as Bidirectional Forwarding Detection (BFD) because PE router 16A and CE router 18A are directly coupled by a physical link, PE router 16A may not be able to notify CE router 18B that PE router 16A is being taken offline for maintenance. The BFD protocol is defined in RFC 5880, which is herein incorporated by reference. While PE router 16A and CE router 18A may establish a BFD session that enables PE router 16A to notify CE router 18A that PE router 16A is going offline for maintenance, PE router 16A may not be able to notify CE router 18B that PE router 16A is going offline for maintenance using a BFD session because PE router 16A and CE router 18B are not directly coupled by a physical link. As such, under the RFC 3137 in OSPF and RFC 3787 specifications, CE router 18B would continue to send network traffic to CE router 18A using a link in the IGP domain that causes traffic to flow on VPLS pseudowire 21A, although PE router 16A has been taken offline for maintenance. Consequently, such network traffic may be dropped or black-holed. Techniques are described in this disclosure to prevent transient traffic black-holing in an overlay network when a router, such as PE router 16A is taken offline for maintenance.

As further described with respect to FIG. 1, techniques of the disclosure allow CE router 18B to divert network traffic to alternate PE router 16D before primary PE router 16A is taken offline for maintenance, such that rerouting of network traffic may prevent transient traffic black-holing at PE router 16A. For example, PE router 16A may initially receive one or more instructions that cause PE router 16A to commence with maintenance. PE router 16A may receive the one or more instructions in response to user input from an administrator or automatically as a result of a scheduled or asynchronous event.

In response to receiving the one or more instructions to commence with maintenance at PE router 16A, PE router 16A may send a BFD packet to CE router 18A that includes data usable by CE router 18A to determine that PE router 16A is being taken offline for maintenance. In other examples, CE router 18A may determine that PE router 16A has not sent a BFD packet within a specified time interval, and therefore PE router 16A is being taken offline for maintenance. In any case, CE router 18A, upon being notified that PE router 16A is being taken offline for maintenance, may stop forwarding network traffic to CE router. In particular, CE router 18A may determine information identifying logical link 30 in its forwarding information and set the link state of logical link 30 to a "link overload" state. To identify logical link 30, CE router 18A may determine which of its interfaces is coupled to PE router 16A via physical link 26A, on which CE router 18A determined that PE router 16A is being taken offline. CE router 18A may then determine the identified interface is used to send and receive network traffic for logical link 30.

CE router 18A may set the link state of logical link 30 to a "link overload" state by assigning a metric to the logical link 30 that indicates the link is not usable to send or receive any network traffic. Accordingly, in some examples, overloading a link may refer to configuring a router to not use the link to forward and/or receive network traffic. In some examples, the metric may be a value in range of values, where a maximum value in the range of values indicates that the link is not usable to send or receive any network traffic. Therefore, CE router 18A may set the link state of logical link 30 to a maximum metric to stop sending traffic to PE router 16A. To continue sending and receiving network traffic with CE router 18B, CE router 18A may re-route any network traffic to CE router 18B using logical link 31 that is present in IGP domain 29. For purposes of FIG. 1, network traffic sent and received using logical link 31 is carried by pseudowire 21B, and network traffic sent and received using logical link 30 is carried by pseudowire 21A.

CE router 18A also advertises the link overload state to other nodes in IGP domain 29 by flooding the information that indicates the link overload state via link-state messages, such as LSAs and LSPs. As further described in this disclosure (e.g., FIGS. 3A-3B), CE router 18A may include a "link-overload TLV" within the link-state message that specifies the link overload state to inform other nodes in the IGP domain of the link overload state of logical link 30. In some examples, the link-overload TLV may be a sub-TLV of another TLV that is included within the link state message. The link-overload TLV may include an address that identifies CE router 18B (e.g., an endpoint of logical link 30 in IGP domain 29).

In the example of FIG. 1, CE router 18B may receive a link-state message that includes the link-overload TLV from CE router 18A. Based on the information included in the link-overload TLV, CE router 18B may set or otherwise assign a metric to logical link 30, such that CE router 18B stops sending network traffic to CE router 18A using logical link 30. For instance, CE router 18B may set the metric for logical link 30 to a maximum metric. In some examples, the traffic reroute performed by CE router 18B may occur due to the metric increase on link 30. Accordingly, the solution proposed by techniques of this disclosure may be backward compatible and therefore only CE router 18B may need to implement the extensions that include the link-overload information, as described in this disclosure. CE router 18B may also advertise the link overload state to other nodes in IGP domain 29 by flooding the information via link-state messages, such as LSAs and LSPs. By advertising the link overload state to other nodes in IGP domain 29, CE router 18B may cause traffic from other nodes to be diverted using links other than logical link 30.

To continue sending and receiving network traffic with CE router 18A, CE router 18B may determine an alternate path to CE router 18A. For instance, CE router 18B may perform a Shortest Path First (SPF) calculation based on the topology of the network in example system 8. In the example of FIG. 1, CE router 18B may determine that logical link 31 is available to send and receive network traffic with CE router 18A. In particular, CE router 18B may determine that logical link 31 is a part of the shortest path between CE router 18A and 18B. In some examples, a "shortest path," may be a path with the fewest number of nodes or hops between CE router 18A and 18B. In some examples, a "shortest path," may be a path that will carry network packets in the shortest amount of time between CE router 18A and 18B. In some examples, a "shortest path," may be a path that satisfies one or more criteria when carrying packets between CE router 18A and 18B.

In response to determining that logical link 31 is available to send and receive network traffic with CE router 18A, CE router 18B may configure one or more of its packet forwarding engines (or "forwarding units") to forward network traffic to CE router 18A using logical link 31. In this way, CE router 18B may re-route network traffic from CE router 18B to CE router 18A to bypass PE router 16A that is going offline for maintenance.

In the techniques of the disclosure described in FIG. 1, PE router 16A may continue forwarding packets during the time period from when PE router 16A initially notifies CE router 18A is being taken offline for maintenance until PE router 16A no longer receives network packets from PE router 16B or CE router 18A. In some examples, PE router 16A may continue forwarding packets during the time period from when PE router 16A initially notifies CE router 18A is being taken offline for maintenance until a timer of a defined time duration expires. The defined time duration may be set by an administrator or may be a hardcoded value in PE router 16A. In any case, PE router 16A may start the timer when PE router 16A notifies CE router 18A that PE router 16A is being taken offline for maintenance, and may continue forwarding network traffic until the timer expires.

As described above, techniques of the disclosure may prevent transient black-holing of traffic in an overlay network when PE router 16A is taken offline for maintenance. By incorporating a link-overload TLV into link-state messages, techniques of the disclosure enable CE router 18B in IGP domain 29, which is not directly coupled to PE router 16A, to identify the particular link (e.g., logical link 30) that shall be bypassed. Accordingly, CE router 18B in IGP domain 29 may re-route network traffic along an alternate path (e.g., logical link 31) that does not include PE router 16A being taken offline for maintenance. In this way, techniques of the disclosure may avoid transient black-holing of traffic at PE router 16A. In some examples, the described overload functionality in the techniques of this disclosure may be achieved in overlay networks without requiring any configuration overheads and/or requiring only minimal configuration overheads. The techniques of the disclosure may also be used during link migrations to achieve traffic diversion.

Figure 2:
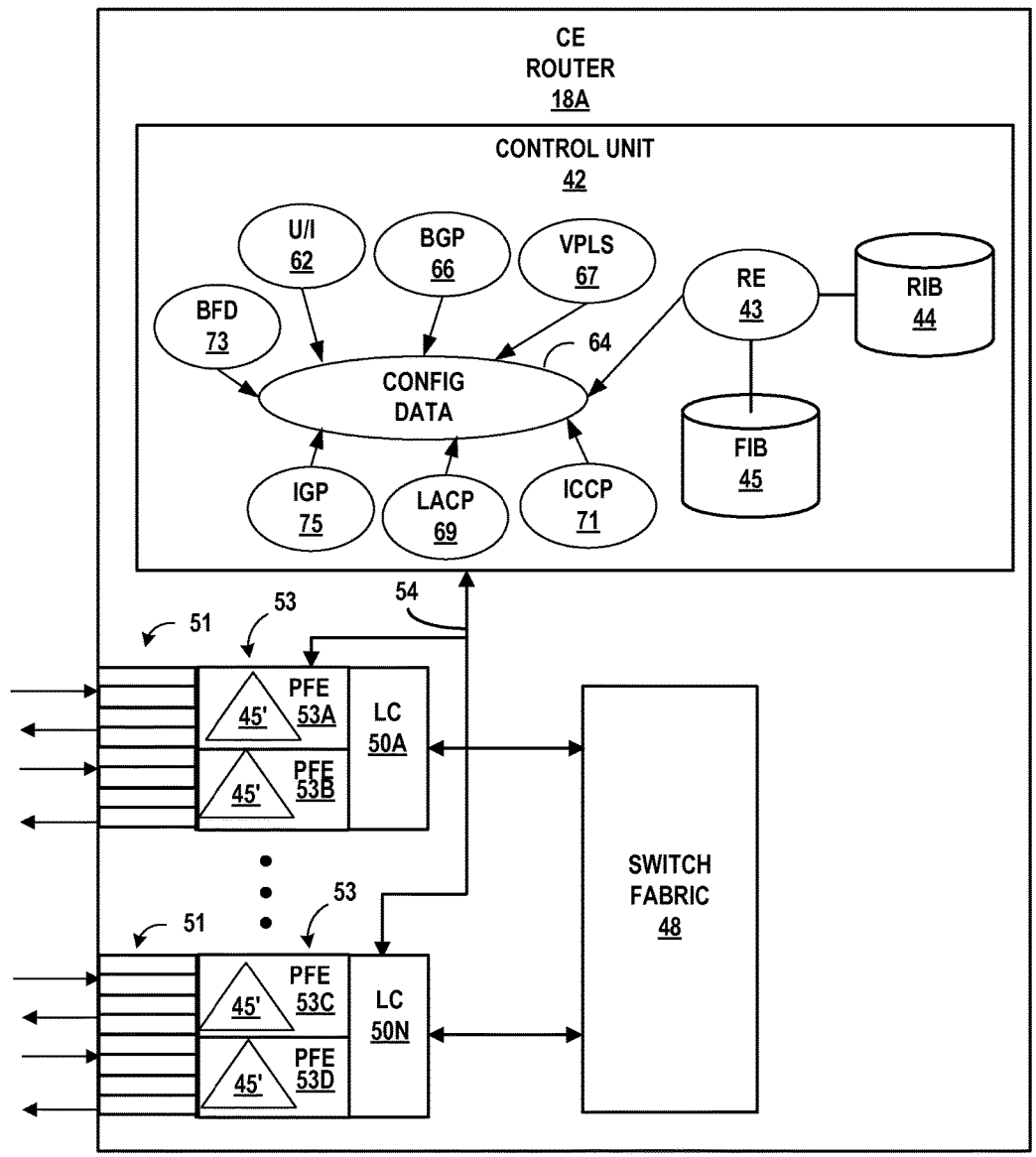
FIG. 2 is a block diagram illustrating an example CE router 18A configured to prevent transient black-holing of traffic in an overlay network, in accordance with the techniques described herein.

FIG. 2 is a block diagram illustrating an example CE router 18A configured to prevent transient black-holing of traffic in an overlay network, in accordance with the techniques described herein. In this example, CE router 18A includes control unit 42 that provides control plane functionality for the network device. CE router 18A also includes switch fabric 48 interconnecting a set of line cards ("LCs") 50A-50N, each of which includes a one or more of packet-forwarding engines ("PFEs") 53 (or "forwarding units") that send and receive traffic by a set of interface cards 51 ("IFCs 51") that typically have one or more physical network interfaces (ports). LCs 50, components thereof, and switch fabric 48 collectively provide a data plane for forwarding transient network traffic, such as the L2 packets described herein. Although not shown in FIG. 2, PFEs 53 may each comprise a central processing unit (CPU), memory and one or more programmable packet-forwarding application-specific integrated circuits (ASICs). Switch fabric 48 provides a high-speed interconnect for forwarding incoming data packets between PFEs 53 for transmission over a network.

Control unit 42 provides an operating environment for various protocols that perform control plane functions for CE router 18A. For example, control unit 42 includes BGP 66 as the control plane protocol for signaling the VPLS service 67, such as signaling and establishing the individual pseudowires to transport the VPLS packet through the VPLS core. VPLS service 67 implements the VPLS protocol, such as including flooding and layer two (L2) learning, e.g., learning of customer device MAC addresses, from inbound pseudowires and association of those customer MAC addresses with corresponding outbound pseudowires and output interfaces. VPLS module 67 may maintain MAC tables for each VPLS instance established by router 40. Learning and flooding may alternatively reside within PFEs 53. Example details of MAC learning by a router within a VPLS domain are further described in U.S. patent application Ser. No. 12/246,810, "INTER-AUTONOMOUS SYSTEM (AS) VIRTUAL PRIVATE LOCAL AREA NETWORK SERVICE (VPLS)," filed on Oct. 7, 2008, the entire contents of which are incorporated herein by reference.

Control unit 42 also includes IGP 75. In some examples, IGP 75 may include OSPF and/or IS-IS. In some examples, IGP 75 may implement a link-overload TLV as described in this disclosure. Control 42 may also include BFD 73, which may be an implementation of the BFD protocol.

Control unit 42 may also provide an operating environment for execution of a routing engine 43 ("RE 43") that controls L3 routing and L2 forwarding functions. In general, routing engine 43 maintains a routing information based (RIB) 44 that stores L3 routing information and L2 topology data representing a logical topology of the L2 network, e.g., a spanning tree, from the perspective of the interfaces. RIB 44 may also store updated MAC tables, MPLS label allocations and pseudowire information. Based on RIB 44, RE 43 generates forwarding information based (FIB) 45 to contain forwarding data structures for installing within (e.g., programming) PFEs 53.

In the example of FIG. 2, control unit 42 includes a user interface ("U/I") 62 with which an administrator interacts, either directly or by way of a provisioning system or software agent, to configure CE router 18A. User interface 62 stores the information as configuration data 64. Link Aggregation Control Protocol (LACP) 69 (optional) operates in a modified manner to bundle logical interfaces associated with the selected pseudowires and treat the bundle as a single logical interface in terms of L2 forwarding. In the case router 40 is coupled to the multi-homed, active-active access network, the administrator may interact with U/I 62 to form the customer-facing LAG of multi-homed L2 access links RE 43 may generate FIB 45 to include forwarding information that is used by control unit 42 to configure LC's 50.

In the example of FIG. 2, control unit 42 is connected to each of LCs 50 by a dedicated internal communication link 54. For example, dedicated link 54 may comprise a 200 Mbps or Gigabit Ethernet connection for internal communication between the multiple components of router 40. In one embodiment, control unit 42 communicates data representative of a software copy 45' of FIB 45 into PFEs 53 to program the PFEs and thereby control forwarding of traffic by the corresponding components within the data plane. This allows the software FIB stored in memory (e.g., on-chip RAM) of in each of PFEs 53 to be updated without degrading packet-forwarding performance of CE router 18A. In some instances, control unit 42 may derive separate and different software FIBs for each respective PFEs 53. In addition, one or more of PFEs 53 may include packet-forwarding ASICs (not shown) that PFEs 53 program with a hardware-copy of FIB based on the software FIBs (i.e., hardware versions of the software FIBs) copied to each respective PFE 30. In other, more complex embodiments, L2 switch may have many more LCs 50 (e.g., 48 or 64 FPCs), each of which may have four PFEs 50 that each couple to up to sixteen interface cards 51.

CE router 18A may be configured by an administrator, using U/I 62, to join an IGP domain, such as IGP domain 29. In FIG. 2, IGP may run as an overlay network on VPLS pseudowires. Accordingly, PE routers that are configured to provide the VPLS pseudowires may not be visible to CE router 18A in the IGP domain. CE router 18A may exchange link state messages with other routers in the IGP domain based on topology of the network and changes to the topology of the network. In some examples, control unit 42 may store information in FIB 45 that associates identifiers of interfaces in LCs 50 with identifiers of physical links. In some examples, control unit 42 may store information in FIB 45 that associates identifiers of interfaces in LCs 50 with identifiers of logical links.

In the example of FIG. 2, PE router 16A may receive one or more instructions to initiate maintenance on PE router 16A from an administrator or as a result of a scheduled or asynchronous event. As described in FIG. 1, CE router 18A may determine or otherwise be notified by PE router 16A that PE router 16A is being taken offline for maintenance. In some examples, PE router 16A may determine or otherwise be notified that PE router 16A is being taken offline for maintenance in a BFD session that uses BFD packets.

In response to being notified that PE router 16A is being taken offline for maintenance, CE router 18A may stop forwarding network traffic to PE router 16A. In particular, RE 43 may determine information identifying logical link 30 in FIB 45 and set the link state of logical link 30 to a "link overload" state. For instance if PFE 53A includes or is otherwise coupled to an interface that is further coupled to physical link 26A between PE router 16A and CE router 18A, RE 43 may determine the identified interface is used to send and receive network traffic for logical link 30. RE 43 may associate or otherwise assign a metric to data in FIB 45 that represents logical link 30 that causes PE router 16A to stop sending network traffic to PE router 16A using the interface coupled to physical link 26A. In the example of FIG. 2, RE 43 may associate or otherwise assign a maximum metric to data in FIB 45 that represents logical link 30 and/or the interface of PFE 53A that is coupled to PE router 16A. RE 43 may configure one or more of LCs 50 based on the updated information in FIB 45.

To continue sending and receiving network traffic with CE router 18B, RE 43 may configure one or more of LCs 50 to re-route any network traffic to CE router 18B using logical link 31 that is present in IGP domain 29. In particular, RE 43 may determine information identifying logical link 31 in FIB 45 and update FIB 45 to forward network traffic to CE router 18B using logical link 31. For instance, RE 43 may identify an interface of interfaces 51 that is coupled to physical link 26B, which is used to carry network traffic for logical link 31. RE 43 may update FIB 45 to forward network packets using the identified interface. RE 43 may configure one or more of LCs 50 based on the updated information in FIB 45. In this way, CE router 18A may re-route traffic to CE router 18B using logical link 31 and bypass PE router 16A.

CE router 18A also advertises the link overload state to other nodes in IGP domain 29 by flooding the information that indicates the link overload state via link-state messages, such as LSAs and LSPs. RE 43 may cause one or more of LCs 50 to send link-state messages that include the information that indicates the link overload state to other routers in IGP domain 29 using one or more of interfaces 51. RE 43 may generate the link-state message that includes a link-overload TLV.

In the case CE router 18A runs OSPF as IGP 75, RE 43 may include a link-overload TLV in the link state message that defines a set of fields with information that define a type, a length, and a remote IP address. The remote IP address may be the IP address of CE router 18B. RE 43 may determine that CE router 18B is other endpoint of logical link 30 and include the IP address of CE router 18B in remote IP address field of the link-overload TLV. The type field may include a value that indicates that the sub TLV is a link-overload TLV. The length field may include a value that indicates the length of link-overload TLV or a portion of the overload sub TLV, such as the length of the remote IP address field or the length of the link-overload TLV itself. Further details of the link-overload TLV for OSPF are described in FIGS. 3A-3B. In the case that CE router 18A runs IS-IS as IGP 75, RE 43 may define or set one or more new link overload bits within a TLV of an IS-IS link state message, as further described in FIGS. 3A-3B. In any case, RE 42 causes one or more of LCs 50 to flood link state messages to other routers in IGP domain 29, such as CE router 18B.

CE router 18B receives a link-state message that includes the link-overload TLV from CE router 18A. The receiving node, CE router 18B may process the link-overload TLV based on the link type for which the "link overload" information is received. Based on the information included in the link-overload TLV, CE router 18B may set or otherwise assign a metric to logical link 30, such that CE router 18B stops sending network traffic to CE router 18A using logical link 30. For instance, CE router 18B may set the metric for logical link 30 to a maximum metric. For point-to-point links and P2MP, the metric in the outgoing direction may be set to the maximum metric. CE router 18B may also advertise the link overload state to other nodes in IGP domain 29 by flooding the information via link-state messages, such as LSAs and LSPs. By advertising the link overload state to other nodes in IGP domain 29, CE router 18B may cause traffic from other nodes to be diverted using links other than logical link 30.

To continue sending and receiving network traffic with CE router 18A, CE router 18B may determine an alternate path to CE router 18A. For instance, CE router 18B may perform a Shortest Path First (SPF) calculation based on the topology of the network in example system 8. In the example of FIG. 1, CE router 18B may determine that logical link 31 is available to send and receive network traffic with CE router 18A. In particular, CE router 18B may determine that logical link 31 is a part of the shortest path between CE router 18A and 18B.

In response to determining that logical link 31 is available to send and receive network traffic with CE router 18A, CE router 18B may configure one or more of its packet forwarding engines to forward network traffic to CE router 18A using logical link 31. In this way, CE router 18B may re-route network traffic from CE router 18B to CE router 18A to bypass PE router 16A that is going offline for maintenance.

The operating environment of control unit 42 may be implemented solely in software, or hardware, or may be implemented as a combination of software, hardware or firmware. For example, control unit 42 may include one or more processors which execute software instructions. In that case, control unit 42 may include various software modules or daemons executing on an operating system, and may include a non-transitory computer-readable storage device, such as computer memory or hard disk, for storing executable instructions.

The architecture of router 40 illustrated in FIG. 2 is shown for exemplary purposes only. The disclosure is not limited to this architecture. In other embodiments, router 40 may be configured in a variety of ways. In one embodiment, for example, some of the functionally of control unit 42 may be distributed within PFEs 53. Elements of control unit 42 may be implemented solely in software, or hardware, or may be implemented as combinations of software, hardware, or firmware. For example, control unit 42 may include one or more processors, one or more microprocessors, digital signal processors (DSPs), application specific integrated circuits (ASICs), field programmable gate arrays (FPGAs), or any other equivalent integrated or discrete logic circuitry, or any combination thereof, which execute software instructions. In that case, the various software modules of control unit 42 may comprise executable instructions stored, embodied, or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable storage media may include random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, a solid state drive, magnetic media, optical media, or other computer-readable media. Computer-readable media may be encoded with instructions corresponding to various aspects of router 40, e.g., protocols. Control unit 42, in some examples, retrieves and executes the instructions from memory for these aspects.

Figure 3A:
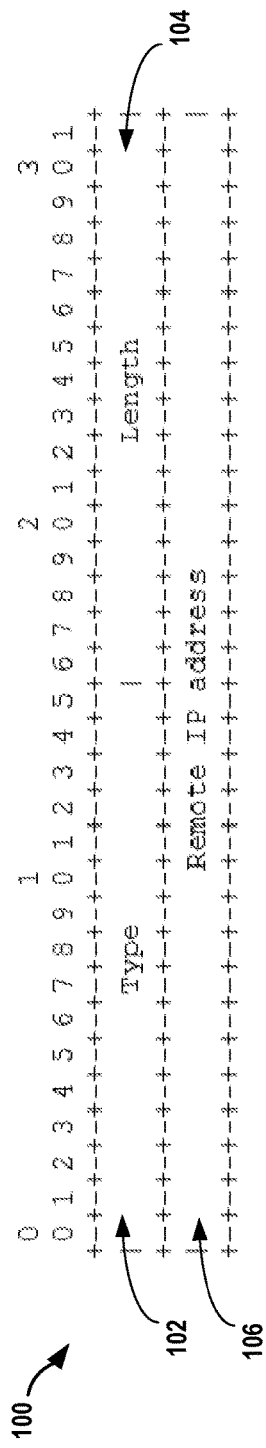
FIGS. 3A-3B illustrate example link-overload TLVs that may be used to prevent transient black-holing of traffic in an overlay network, in accordance with the techniques described herein.
Figure 3B:
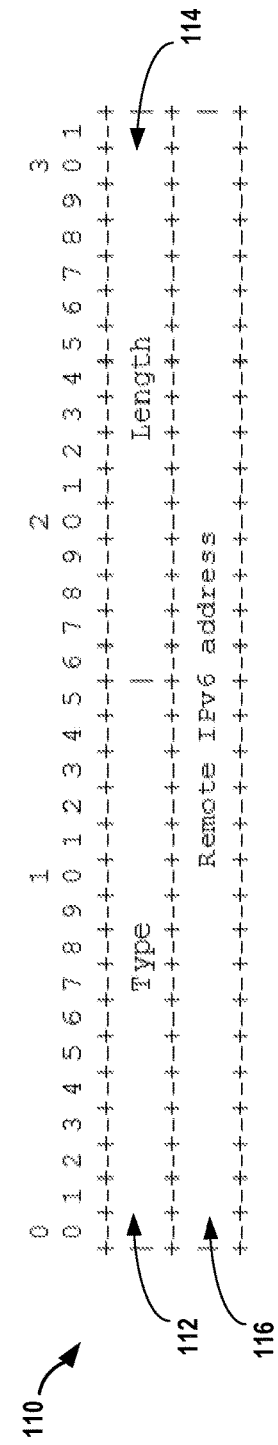

FIGS. 3A-3B illustrate example link-overload TLVs that may be used to prevent transient black-holing of traffic in an overlay network, in accordance with the techniques described herein. As previously described in this disclosure, the link-overload TLV may be a sub-TLV or portion of another TLV included in a network packet. In other examples, the link-overload TLV may be the only TLV in a network packet. In some examples, a link-overload TLV may be generated in a network packet, such as a link-state message, by RE 43, or one or more of LCs 50, as shown in FIG. 2. Techniques of the disclosure provide protocol extensions for new link-overload TLVs that are defined in IS-IS and OSPF to carry link overload information.

FIG. 3A illustrates a link-overload TLV 100 that is generated by CE router 18A for an OSPFv2 link-state message, in accordance with techniques of this disclosure. In some examples, CE router 18A includes link-overload TLV 100 as part of the extended link TLV defined in "OSPFv2 Prefix/Link Attribute Advertisement," draft-ietf-ospf-prefix-link-attr, Feb. 2, 2015, https://datatracker.ietforg/doc/draft-ietf-ospf-prefix-link-attr/?include_text=1, which is hereby incorporated by reference. As shown in FIG. 3A, link-overload TLV 100 may include a type field 100, length field 104, and remote IP address field 106 (e.g., the value field of TLV 100). Link-overload TLV 100 may indicate that the link (e.g., logical link 30) which carries the link-overload TLV 100 is overloaded and the metric for the corresponding link (e.g., logical link 30) identified by the remote IP address should be set to a maximum metric for SPF calculation.

Although shown as a 16-bit field, type field 102 may be of any size in other examples. Type field 102 may include a value that indicates that the sub TLV is a link-overload TLV. In this way, CE router 16B, when processing a link-state message, may determine that the link-state message includes a link-overload TLV, and perform one or more techniques as described in this disclosure, such as setting a metric and/or re-routing network traffic to name only a few example operations.

Although shown as a 16-bit field, length field 104 may be of any size in other examples. Length field 104 may include a value that indicates the length of link-overload TLV or a portion of the overload sub TLV, such as the length of the remote IP address field or the length of the link-overload TLV itself. In some examples, the value of length field 104 may be 4. In the example where the length of the remote IP address field 106 is indicated in length field 104, CE router 16B, when processing a link-state message, may determine the total number of bits in remote IP address field 106 that represent an IP address of a router, such as CE router 16B.

Although shown as a 32-bit field, remote IP address field 106 may be of any size in other examples. Remote IP address field 106 may include an IP address of an endpoint router of a link (e.g., a logical link) in an IGP domain. In some examples, the IP address may be an IPv4 address. For instance, logical link 30, which is visible in IGP domain 29 of FIG. 1, includes endpoint routers CE router 18A and CE router 18B. When generating the value for remote IP address field 106, a first one of the endpoints, e.g., CE router 18A, determines the IP address of the second endpoint, such as the IP address of CE router 18B, and includes the remote IP address in remote IP address field 106. By incorporating the remote IP address into link-overload TLV 100, techniques of the disclosure enable CE router 18B in IGP domain 29 to identify the particular link that will no longer be used by CE router 18B to forward network traffic to CE router 18A. CE router 18B, when processing a link-state message, may use the value of remote IP address field 106 to identify the particular link and associate a metric, such as a maximum metric with the particular link. In this way, CE router 18B may stop forwarding network traffic to CE router 18A using the particular link.

FIG. 3B illustrates a link-overload TLV 110 that is generated by CE router 18A for an OSPFv3 link-state message, in accordance with techniques of this disclosure. In some examples, CE router 18A includes link-overload TLV 110 in the Router-link TLV as defined in "OSPFv3 LSA Extendibility," draft-ietf-ospf-ospfv3-1sa-extend, Feb. 16, 2015, https://datatracker.ietf.org/doc/draft-ietf-ospf-ospfv3-1sa-extend/?include_text=1, which is hereby incorporated by reference. As shown in FIG. 3B, link-overload TLV 110 may include a type field 112, length field 114, and remote IP address field 116 (e.g., the value field of TLV 110). Link-overload TLV 110 may indicate that the link (e.g., logical link 30) which carries the link-overload TLV 110 is overloaded and the metric for the corresponding link (e.g., logical link 30) identified by the remote IP address should be set to a maximum metric for SPF calculation.

Although shown as a 16-bit field, type field 112 may be of any size in other examples. Type field 112 may include a value that indicates that the sub TLV is a link-overload TLV. In this way, CE router 16B, when processing a link-state message, may determine that the link-state message includes a link-overload TLV, and perform one or more techniques as described in this disclosure, such as setting a metric and/or re-routing network traffic to name only a few example operations.

Although shown as a 16-bit field, length field 114 may be of any size in other examples. Length field 114 may include a value that indicates the length of link-overload TLV or a portion of the overload sub TLV, such as the length of the remote IP address field or the length of the link-overload TLV itself. In some examples, the value of length field 114 may be 16. In the example where the length of the remote IP address field 116 is indicated in length field 114, CE router 16B, when processing a link-state message, may determine the total number of bits in remote IP address field 116 that represent an IP address of a router, such as CE router 16B.

Although shown as a 32-bit field, remote IP address field 116 may be of any size in other examples. Remote IP address field 116 may include an IP address of an endpoint router of a link (e.g., a logical link) in an IGP domain. In some examples, the IP address may be an IPv6 address. For instance, logical link 30, which is visible in IGP domain 29 of FIG. 1, includes endpoint routers CE router 18A and CE router 18B. When generating the value for remote IP address field 116, a first one of the endpoints, e.g., CE router 18A, determines the IP address of the second endpoint, such as the IP address of CE router 18B, and includes the remote IP address in remote IP address field 116. By incorporating the remote IP address into link-overload TLV 110, techniques of the disclosure enable CE router 18B in IGP domain 29 to identify the particular link that will no longer be used by CE router 18B to forward network traffic to CE router 18A. CE router 18B, when processing a link-state message, may use the value of remote IP address field 116 to identify the particular link and associate a metric, such as a maximum metric with the particular link. In this way, CE router 18B may stop forwarding network traffic to CE router 18A using the particular link.

In some examples, CE routers 18A and 18B may use IS-IS as the IGP. RFC 5029 defines a link-attributes sub-TLV. RFC 5029 entitled "Definition of an IS-IS Link Attribute Sub-TLV," https://datatracker.ietf.org/doc/rfc5029/?include_text=1, Mar. 2, 2013, is hereby incorporated by reference. In accordance with techniques of the disclosure CE router 18A, when generating a link-state message to indicate a link overload state, may define or otherwise set a new "link overload bit" in the link-attributes sub-TLV. In some examples, the link overload bit may be set at bit position 0x04. The link attributes sub TLV may be carried within TLV-22 as defined by RFC 5029. TLV-22 is further described in RFC 5305 entitled "IS-IS Extensions for Traffic Engineering," https://datatracker.ietf.org/doc/rfc5305/?include_text=1, Mar. 2 2013. By incorporating the setting the link overload bit, techniques of the disclosure enable CE router 18B in IGP domain 29 to identify the particular link that will no longer be used by CE router 18B to forward network traffic to CE router 18A. The link overload bit may enable CE router 18B to determine that the link (e.g., logical link 30) which carries the link overload bit is overloaded should be set to a maximum metric for SPF calculation. In this way, CE router 18B may stop forwarding network traffic to CE router 18A using the particular link based on the link overload bit.

Figure 4:
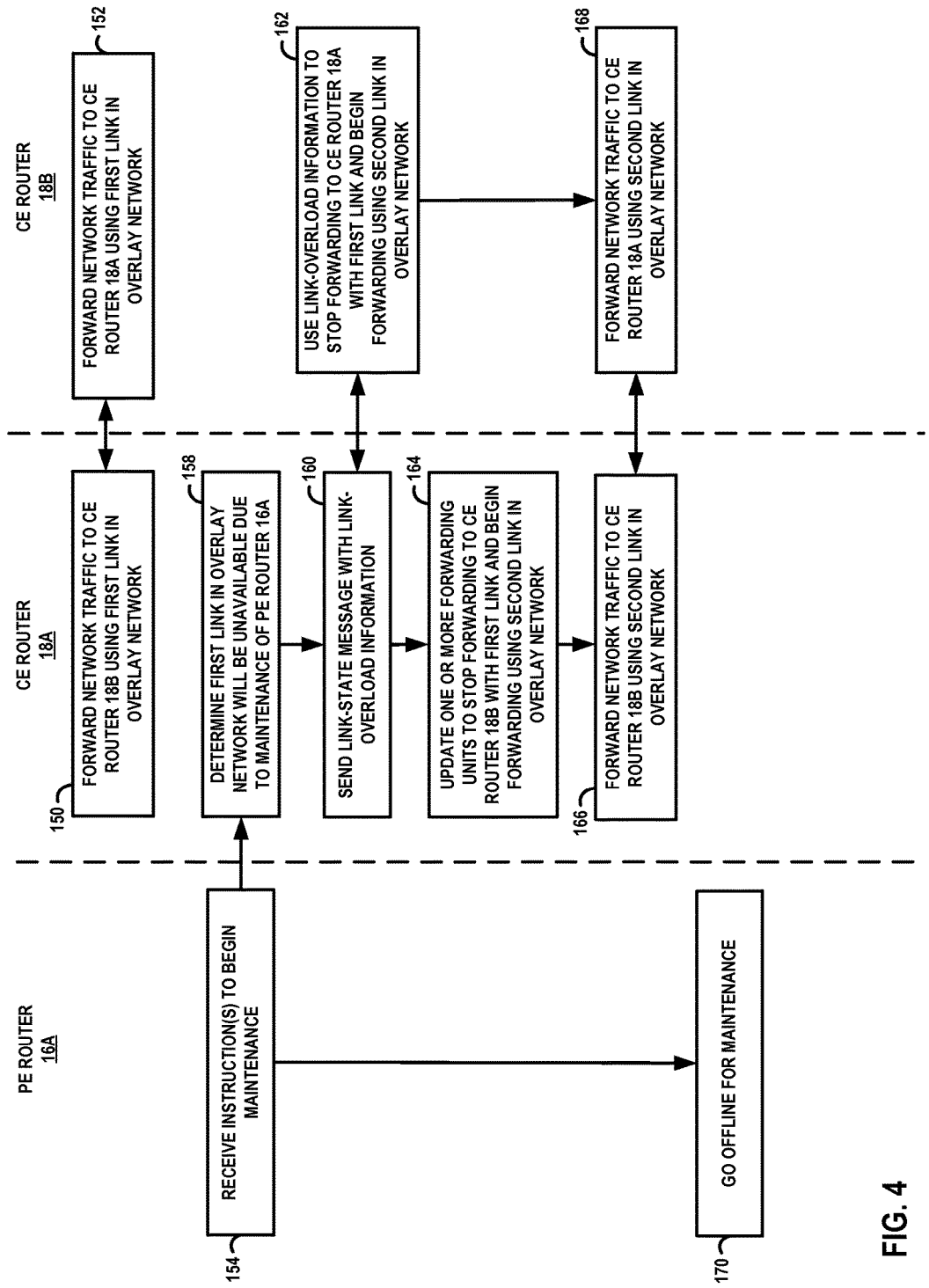
FIG. 4 is flowchart illustrating example operations implemented by multiple network devices to prevent transient black-holing of traffic in an overlay network, in accordance with the techniques described herein.

FIG. 4 is flowchart illustrating example operations implemented by multiple network devices to prevent transient black-holing of traffic in an overlay network, in accordance with the techniques described herein. Example operations in accordance with techniques of the disclosure are illustrated for example purposes with respect to PE router 16A, CE router 18A, and CE router 18B, as described in this disclosure. Initially, CE routers 18A and 18B may join IGP domain 29. IGP domain 29 may include multiple logical links such as logical links 30 and 31. IGP domain 29 may operate as an overlay network on top of underlying layer 2 network. The underlying layer 2 network may implement VPLS and/or IP2SEC running at one or more provider routers, such as PE routers 16A-16D. PE routers 16A-16D may implement one or more pseudowires 21A and 21B, which may comprise a portion of an underlying network on which the overlay network runs.

Upon each of CE routers 18A and 18B joining IGP domain 29, CE router 18A may forward network traffic to CE router 18B using logical link 30 (150), and CE router 18B may forward network traffic to CE router 18A using logical link 30 (152). Network traffic carried by logical link 30 in the IGP overlay network is also carried by pseudowire 21A in the underlying layer 2 network. At a later time, PE router 16A may receive the one or more instructions in response to user input from an administrator or automatically as a result of a scheduled or asynchronous event (154).

CE router 18A may determine that PE router 16A will be undergoing maintenance, and therefore logical link 30 will be unavailable to forward network traffic due to maintenance of PE router 16A (158). For instance, PE router 16A may notify CE router 18A by sending one or more messages to CE router 18A, or CE router 18A may determine that PE router 16A is no longer sending messages that would otherwise indicate that PE router 16A is online and/or available to forward network traffic.

CE router 18A may flood link-state messages to other routers in IGP domain 29 that include link overload information to overload logical link 30 (160). In some examples, the link-overload information may include a link-overload TLV and/or one or more link-overload bits as described in FIGS. 3A-3B. The link-state messages may include an extension that stores the link-overload information. To continue sending and receiving network traffic with CE router 18B, CE router 16A may also configure one or more of its forwarding units to re-route any network traffic to CE router 18B using logical link 31 that is present in IGP domain 29 (164). In this way, CE router 18A may re-route traffic to CE router 18B using logical link 31 and bypass PE router 16A. Accordingly, CE router 18A may forward network traffic to CE router 18B using logical link 31 (166).

CE router 18B receives a link-state message that includes the link-state information from CE router 18A. CE router 18B may process the link-overload information and set or otherwise assign a metric to overload logical link 30, such that CE router 18B stops sending network traffic to CE router 18A using logical link 30 (162). For instance, CE router 18B may set the metric for logical link 30 to a maximum metric. To continue sending and receiving network traffic with CE router 18A, CE router 18B may determine an alternate path to CE router 18A. For instance, CE router 18B may perform a Shortest Path First (SPF) calculation based on the topology of the network in example system 8. CE router 18B may determine that logical link 31 is available to send and receive network traffic with CE router 18A, and begin forwarding traffic using logical link 31 (168).

As shown in FIG. 4, PE router 16A may continue forwarding packets during the time period from when PE router 16A initially notifies CE router 18A is being taken offline for maintenance until PE router 16A no longer receives network packets from PE router 16B or CE router 18A (170). In other examples, PE router 16A may continue forwarding packets during the time period from when PE router 16A initially notifies CE router 18A is being taken offline for maintenance until a timer of a defined time duration expires. The defined time duration may be set by an administrator or may be a hardcoded value in PE router 16A. In any case, PE router 16A may start the timer when PE router 16A notifies CE router 18A that PE router 16A is being taken offline for maintenance, and may continue forwarding network traffic until the timer expires.

Figure 5:
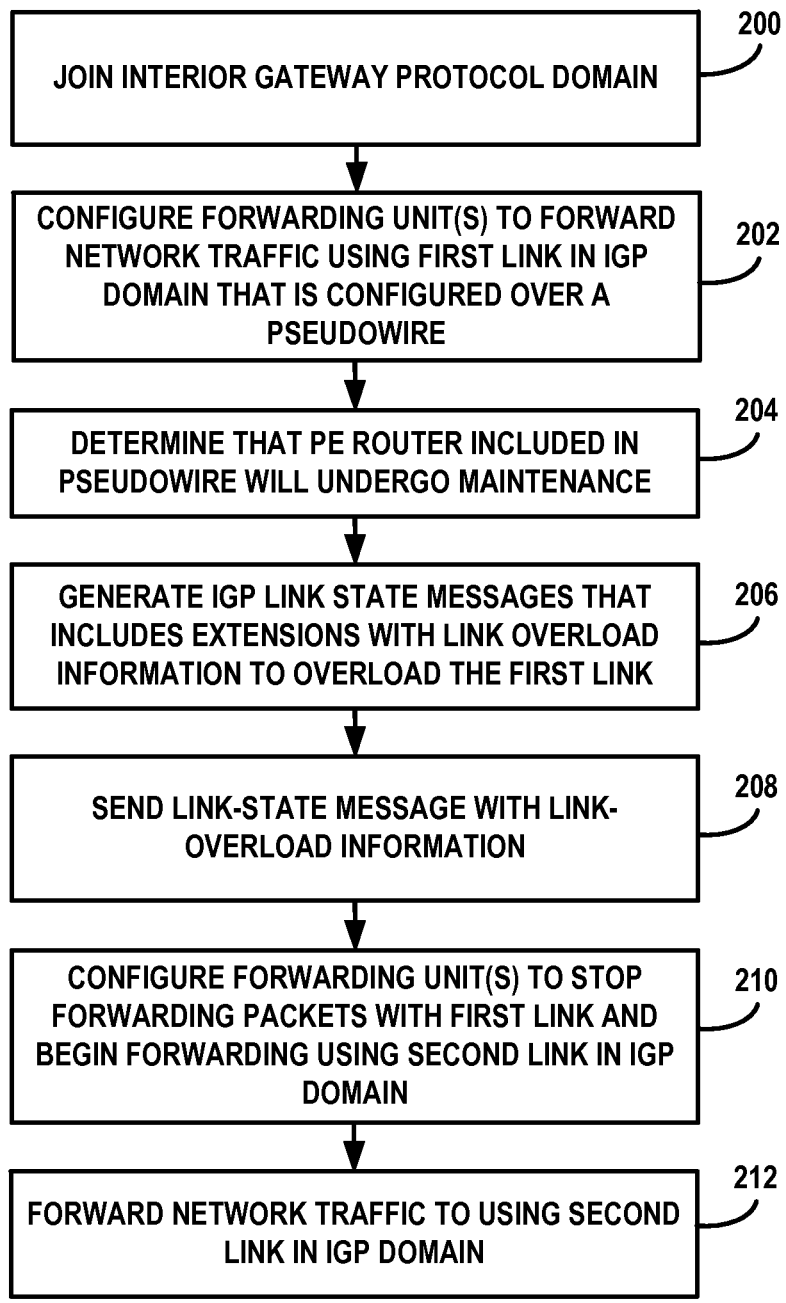
FIG. 5 is flowchart illustrating example operations of a network device that may prevent transient black-holing of traffic in an overlay network, in accordance with the techniques described herein.

FIG. 5 is flowchart illustrating example operations of a network device that may prevent transient black-holing of traffic in an overlay network, in accordance with the techniques described herein. For purposes of illustration only, the example operations are described below within the context of CE router 18A in this disclosure. Initially, CE router 18A may join IGP domain 29 (200). IGP domain 29 may include multiple logical links such as logical links 30 and 31. As previously described in this disclosure, IGP domain 29 may operate as an overlay network on top of underlying layer 2 network. PE routers 16A-16D may implement one or more pseudowires 21A and 21B, which may comprise a portion of an underlying network on which the overylay network runs.

CE router 18A may configure one or more of its forwarding units to forward network traffic to CE router 18B using logical link 30 (202). Network traffic carried by logical link 30 in the IGP overlay network is also carried by pseudowire 21A in the underlying layer 2 network. At a later time, PE router 16A may receive the one or more instructions in response to user input from an administrator or automatically as a result of a scheduled or asynchronous event. CE router 18A may determine that PE router 16A will be undergoing maintenance, and therefore logical link 30 will be unavailable to forward network traffic due to maintenance of PE router 16A (204).

CE router 18A may generate link-state messages that include link overload information to overload logical link 30 (206). In some examples, the link-overload information may include a link-overload TLV and/or one or more link-overload bits as described in FIGS. 3A-3B. The link-state messages may include an extension that stores the link-overload information. CE router 18A may send the generated link-state messages to other routers in IGP domain 29 (208). To continue sending and receiving network traffic with CE router 18B, CE router 16A may also configure one or more of its forwarding units to re-route any network traffic to CE router 18B using logical link 31 that is present in IGP domain 29 (210). In this way, CE router 18A may re-route traffic to CE router 18B using logical link 31 and bypass PE router 16A. Accordingly, CE router 18A may forward network traffic to CE router 18B using logical link 31 (212).

Figure 6:
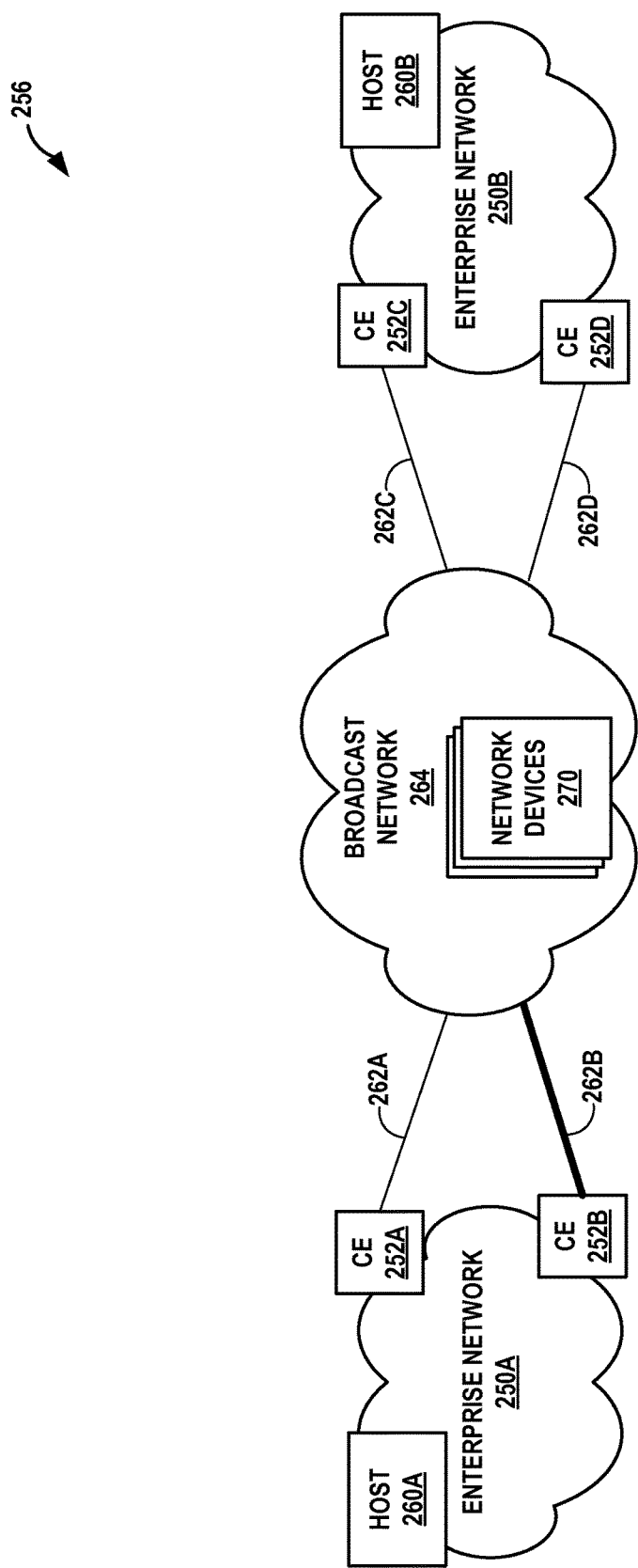
FIG. 6 is block diagram of multiple network devices that may implement operations prevent transient black-holing of traffic in a broadcast network, in accordance with the techniques described herein.

FIG. 6 is block diagram of multiple network devices that may implement operations prevent transient black-holing of traffic in a broadcast network, in accordance with the techniques described herein. FIG. 6 illustrates CE routers 252A-252D and network devices 270 (e.g., routers, switches, etc.) that implement a broadcast network 264. CE routers 252A-252D are coupled to broadcast network 264 by links 262A-262D. Broadcast network 264 may operate or otherwise be implemented within, as a part of, or otherwise support an IGP domain. CE routers 252A and 252B may be included in enterprise network 250A, and CE routers 252C and 252D may be included in enterprise network 252B. CE routers 252A and 252B may be multi-homed one or more of network devices 270, and CE routers 252C and 252D may be multi-homed to one or more of network devices 270 that implement broadcast network 264. In the example of FIG. 6, CE router 252D may be the designated router for broadcast network 264. Accordingly, CE router 252D may originate network link advertisements on behalf of broadcast network 264. Using VPLS and/or IP2SEC, enterprise networks 250A and 250B may appear to be directly attached to the same local area network (LAN), and therefore hosts 260A and 260B may appear to be attached to the same LAN. CE routers 252A-252D may run an IGP, such as OSPF or IS-IS, such that each of CE routers 252A-252D are included in the same IGP domain.

In FIG. 6, enterprise network 250A may be multi-homed to broadcast network 264 with a broadcast link 262B. When broadcast link 262B is going to be replaced or otherwise taken down for maintenance, techniques of the disclosure may cause other network devices, such as CE routers 252C and 252D in broadcast network 264 to divert network traffic to CE router 252A, rather than sending network traffic to CE router 252B. For instance, broadcast link 262B may become unavailable due to maintenance at CE router 252B.

In response to CE router 252B determining that it is being taken offline for maintenance, CE router 252B may overload link 262B. For instance, CE router 252B may set the metric to link 262B to a maximum metric. Accordingly, CE router 252B may stop sending network traffic using link 262B. However, before CE router 252B stops sending network traffic using link 262B, CE router 252B may send link-state messages to other routers in the same IGP domain, such as CE router 252A, 252C, and 252D. The link-state messages may include link-overload information as described in accordance with techniques of this disclosure. For instance, the link-state messages may include link-overload TLVs or link-overload bits, as described in FIGS. 3A-3B.

Each of routers CE 252A, 252C, and 252D may receive the link-state messages that include the link-overload information. In the example of FIG. 6, because CE router 252D is the designated router, CE router 252D may remove CE router 252B from its list of neighbors in broadcast network 264. CE router 252D may perform an SPF computation without CE router 252B and update its forwarding plane to forward network traffic to enterprise network 250A using CE router 242A and link 262A. CE router 252D may also flood information indicating the removal of CE router 252B in link-state messages to other routers in broadcast network 264, such as CE routers 252A and 252C. Upon receiving the link-state message, other routers of broadcast network 264, such as CE router 252C may perform an SPF computation without CE router 252B and update its forwarding plane to forward network traffic to enterprise network 250A using CE router 242A and link 262A. In this way, CE routers other than CE router 252B in broadcast network 264 may be notified in advance that link 262B will be unavailable, and re-route network traffic to enterprise network 250A prior to link 262B being taken offline. Accordingly, such techniques may reduce or prevent transient black-holing of traffic at CE router 252B.

In the techniques of the disclosure described in FIG. 6, CE router 252B may continue forwarding packets during the time period from when CE router 252B initially notifies other CE routers in broadcast network 264 that link 262B is being taken offline for maintenance until CE router 252B no longer receives network packets from other routers. In some examples, CE router 252B may continue forwarding packets during the time period from when CE router 252B initially notifies other routers in broadcast network 264 that link 262B is being taken offline for maintenance until a timer of a defined time duration expires. The defined time duration may be set by an administrator or may be a hardcoded value in CE router 252B. In any case, CE router 252B may start the timer when CE router 252B determines that link 262B is being taken offline for maintenance, and may continue forwarding network traffic until the timer expires.

It some examples, it may be necessary that the originator and receiver of link-overload TLV understand the extensions defined in this document and in case of broadcast links the originator and the designated router may need to understand the extensions. Other nodes in the network, however, may not have to understand the extensions. If the receivers of the link-overload TLV do not understand it, they may ignore it without causing other impacts to the network.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable medium encoded with instructions. Instructions embedded or encoded in an article of manufacture including a computer-readable medium encoded, may cause one or more programmable processors, or other processors, to implement one or more of the techniques described herein, such as when instructions included or encoded in the computer-readable medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media. In some examples, a computer-readable storage media may include non-transitory media. The term "non-transitory" may indicate that the storage medium is not embodied in a carrier wave or a propagated signal. In certain examples, a non-transitory storage medium may store data that can, over time, change (e.g., in RAM or cache).

It is to be recognized that depending on the embodiment, certain acts or events of any of the methods described herein can be performed in a different sequence, may be added, merged, or left out altogether (e.g., not all described acts or events are necessary for the practice of the method). Moreover, in certain embodiments, acts or events may be performed concurrently, e.g., through multi-threaded processing, interrupt processing, or multiple processors, rather than sequentially.

Various embodiments of the invention have been described. These and other embodiments are within the scope of the following claims.

The invention claimed is:

1. A method comprising:
    executing, by a first customer edge network device included in a link state domain, an Interior Gateway Protocol (IGP) to exchange link-state messages with a remote customer edge network device in the link-state domain, wherein the link-state domain includes a first link and a second link defined in an overlay network that operates over an underlying network,
    wherein the first link couples the first customer edge network device and the remote customer edge network device via a first provider edge router of the underlying network and a first layer-2 pseudowire over the underlying network, the first layer-2 pseudowire implemented by the first provider edge router, and
    wherein the second link couples the first customer edge network device and the remote customer edge network device and via a second, different provider edge router of the underlying network and a second, different layer-2 pseudowire that is implemented by the second provider edge router;
    determining, by the first customer edge network device, that the first provider edge router coupled to the first customer edge router is going offline;
    in response to determining that the first provider edge router is going offline, generating, by the first customer edge network device, an IGP link-state message that includes link overload information that indicates the first link is overloaded; and
    sending, by the first customer edge network device and to the remote customer edge network device, the IGP link-state message that includes the link overload information to direct the remote customer edge network device to stop sending network traffic to the first customer edge network device using the overloaded first link.

2. The method of claim 1, wherein the first provider edge router is not visible in the link-state domain to the first customer edge network device and the remote customer edge network device.

3. The method of claim 1, wherein the IGP is Open Shortest Path First (OSPF), the method further comprising:
    determining, by the first customer edge network device, an Internet Protocol (IP) address of the remote customer edge network device;
    wherein generating the IGP link-state message that includes the link-state information, further comprises defining, by the first customer edge network device, a link-overload Type-Length-Value (TLV) within the IGP link-state message, wherein the link-overload TLV indicates a type of the link-overload TLV, a length of at least a portion of the link-overload TLV, and the IP address of the remote customer edge network device, and
    wherein sending the IGP link-state message, comprises sending, by the first customer edge network device, the IGP link-state message to the remote customer edge network device using the first link that couples the first customer edge network device to the remote customer edge network device in the link-state domain.

4. The method of claim 1,
    wherein the IGP is Intermediate System-to-Intermediate System (IS-IS),
    wherein generating the IGP link-state message that includes the link-state information, further comprises setting, by the first customer edge network device, a bit at a particular position within a link-attributes sub-TLV of the link state message, and
    wherein sending the IGP link-state message, comprises sending, by the first customer edge network device, the IGP link-state message to the remote customer edge network device using the first link that couples the first customer edge network device to the remote customer edge network device in the link-state domain.

5. The method of claim 1, further comprising:
configuring, by the first customer edge network device, at least one forwarding unit of the first customer edge network device to stop sending network traffic to the remote customer edge network device using the first link and forward network traffic to the remote customer edge network device using the second link.

6. A first customer edge network device, comprising:
at least one processor;
at least one module operable by the at least one processor to:
execute an Interior Gateway Protocol (IGP) to exchange link-state messages with a remote customer edge network device included in a link-state domain that includes the first customer edge network device, wherein the link-state domain includes a first link and a second link defined in an overlay network that operates over an underlying network,
wherein the first link couples the first customer edge network device and the remote customer edge network device via a first provider edge router of the underlying network and a first layer-2 pseudowire over the underlying network, the first layer-2 pseudowire implemented by the first provider edge router, and
wherein the second link couples the first customer edge network device and the remote customer edge network device and via a second, different provider edge router of the underlying network and a second, different layer-2 pseudowire that is implemented by the second provider edge router;
determine that the first provider edge router coupled to the first customer edge network device is going offline;
in response to a determination that the first provider edge router is going offline, generate an IGP link-state message that includes link overload information that indicates the first link is overloaded; and
send, to the remote customer edge network device, the IGP link-state message that includes the link overload information to direct the remote customer edge network device to stop sending network traffic to the first customer edge network device using the overloaded first link.

7. The first customer edge network device of claim 6, wherein the first provider edge router is not visible in the link-state domain to the first customer edge network device and the remote customer edge network device.

8. The first customer edge network device of claim 6, wherein the IGP is Open Shortest Path First (OSPF), wherein the at least one module is operable by the at least one processor to:
determine an Internet Protocol (IP) address of the remote customer edge network device;
wherein the at least one module that is operable to generate the IGP link-state message that includes the link-state information, is further operable to define a link-overload Type-Length-Value (TLV) within the IGP link-state message, wherein the link-overload TLV indicates a type of the link-overload TLV, a length of at least a portion of the link-overload TLV, and the IP address of the remote customer edge network device, and
wherein the at least one module that is operable to send the IGP link-state message, is further operable to send the IGP link-state message to the remote customer edge network device using the first link that couples the first customer edge network device to the remote customer edge network device in the link-state domain.

9. The first customer edge network device of claim 6, wherein the IGP is Intermediate System-to-Intermediate System (IS-IS),
wherein the at least one module that is operable to generate the IGP link-state message that includes the link-state information, is further operable to set a bit at a particular position within a link-attributes sub-TLV of the link state message, and
wherein the at least one module that is operable to send the IGP link-state message, is further operable to send the IGP link-state message to the remote customer edge network device using the first link that couples the first customer edge network device to the remote customer edge network device in the link-state domain.

10. The first customer edge network device of claim 6, wherein the at least one module is operable by the at least one processor to:
configure at least one forwarding unit of the first customer edge network device to stop sending network traffic to the remote customer edge network device using the first link and forward network traffic to the remote customer edge network device using the second link.

11. A non-transitory computer-readable medium comprising instructions for causing at least one programmable processor of a first customer edge network device to:
execute an Interior Gateway Protocol (IGP) to exchange link-state messages with a remote customer edge network device in the link-state domain, wherein the link-state domain includes a first link and a second link defined in an overlay network that operates over an underlying network,
wherein the first link couples the first customer edge network device and the remote customer edge network device via a first provider edge router of the underlying network and a first layer-2 pseudowire over the underlying network, the first layer-2 pseudowire implemented by the first provider edge router, and
wherein the second link couples the first customer edge network device and the remote customer edge network device and via a second, different provider edge router of the underlying network and a second, different layer-2 pseudowire that is implemented by the second provider edge router;
determine that the first provider edge router coupled to the first customer edge network device is going offline;
in response to a determination that the first provider edge router is going offline, generate an IGP link-state message that includes link overload information that indicates the first link is overloaded; and
send, to the remote customer edge network device, the IGP link-state message that includes the link overload information to direct the remote customer edge network device to stop sending network traffic to the first customer edge network device using the overloaded first link.

12. The non-transitory computer-readable medium of claim 11, wherein the provider edge router is not visible in the link-state domain to the first customer edge network device and the remote customer edge network device.

13. The non-transitory computer-readable medium of claim 11, wherein the IGP is Open Shortest Path First (OSPF), the non-transitory computer-readable medium further comprising instructions for causing the at least one programmable processor of the first customer edge network device to:

determine an Internet Protocol (IP) address of the remote customer edge network device;

wherein to generate the IGP link-state message that includes the link-state information, further comprises to define a link-overload Type-Length-Value (TLV) within the IGP link-state message, wherein the link-overload TLV indicates a type of the link-overload TLV, a length of at least a portion of the link-overload TLV, and the IP address of the remote customer edge network device, and wherein to send the IGP link-state message, comprises to send, the IGP link-state message to the remote customer edge network device using the first link that couples the first customer edge network device to the remote customer edge network device in the link-state domain.

14. The non-transitory computer-readable medium of claim 11, wherein the IGP is Intermediate System-to-Intermediate System (IS-IS), the non-transitory computer-readable medium further comprising instructions for causing the at least one programmable processor of the first customer edge network device to:

wherein to generate the IGP link-state message that includes the link-state information, further comprises to set a bit at a particular position within a link-attributes sub-TLV of the link state message, and wherein sending the IGP link-state message, comprises to send the IGP link-state message to the remote customer edge network device using the first link that couples the first customer edge network device to the remote customer edge network device in the link-state domain.

15. The non-transitory computer-readable medium of claim 11 comprising instructions for causing the at least one programmable processor of the first customer edge network device to:

configure at least one forwarding unit of the first customer edge network device to stop sending network traffic to the remote customer edge network device using the first link and forward network traffic to the remote customer edge network device using the second link.

* * * * *